J. M. STELMACH.
ZERO SETTING DEVICE.
APPLICATION FILED JUNE 12, 1914.
1,198,081.
Patented Sept. 12, 1916.
3 SHEETS—SHEET 1.
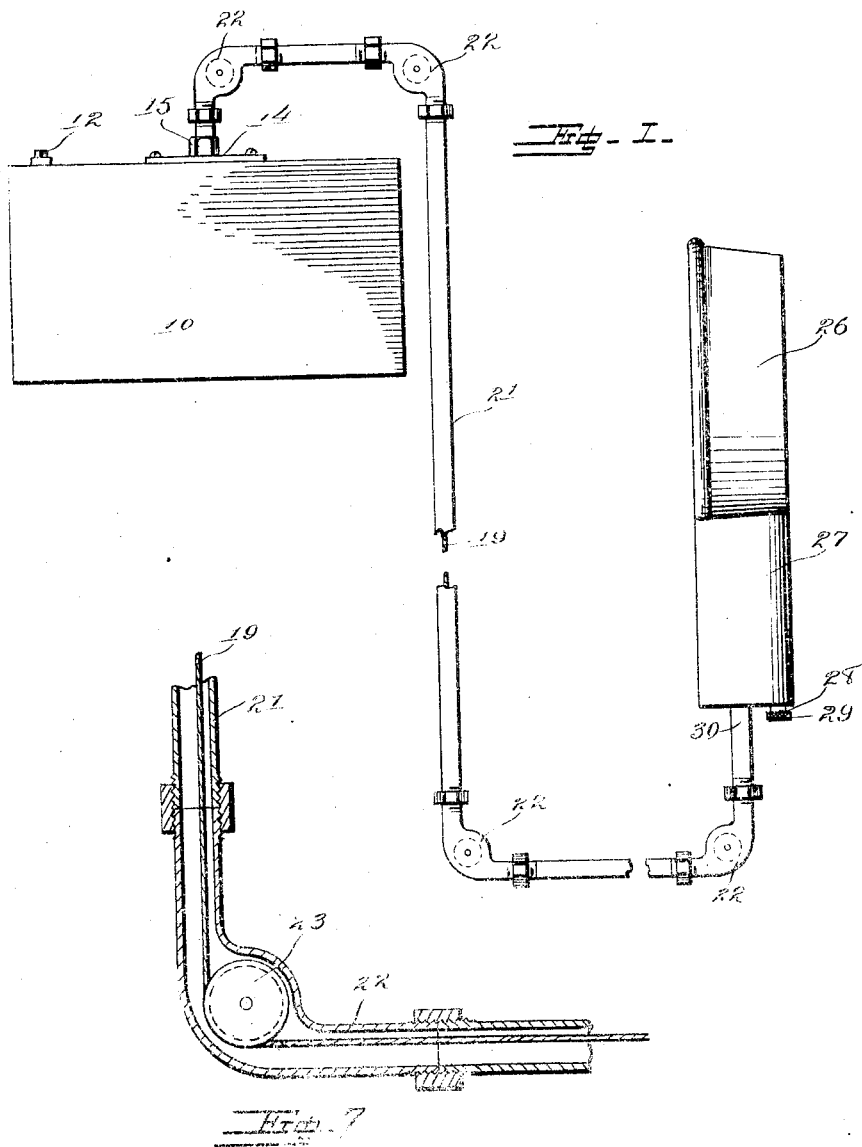

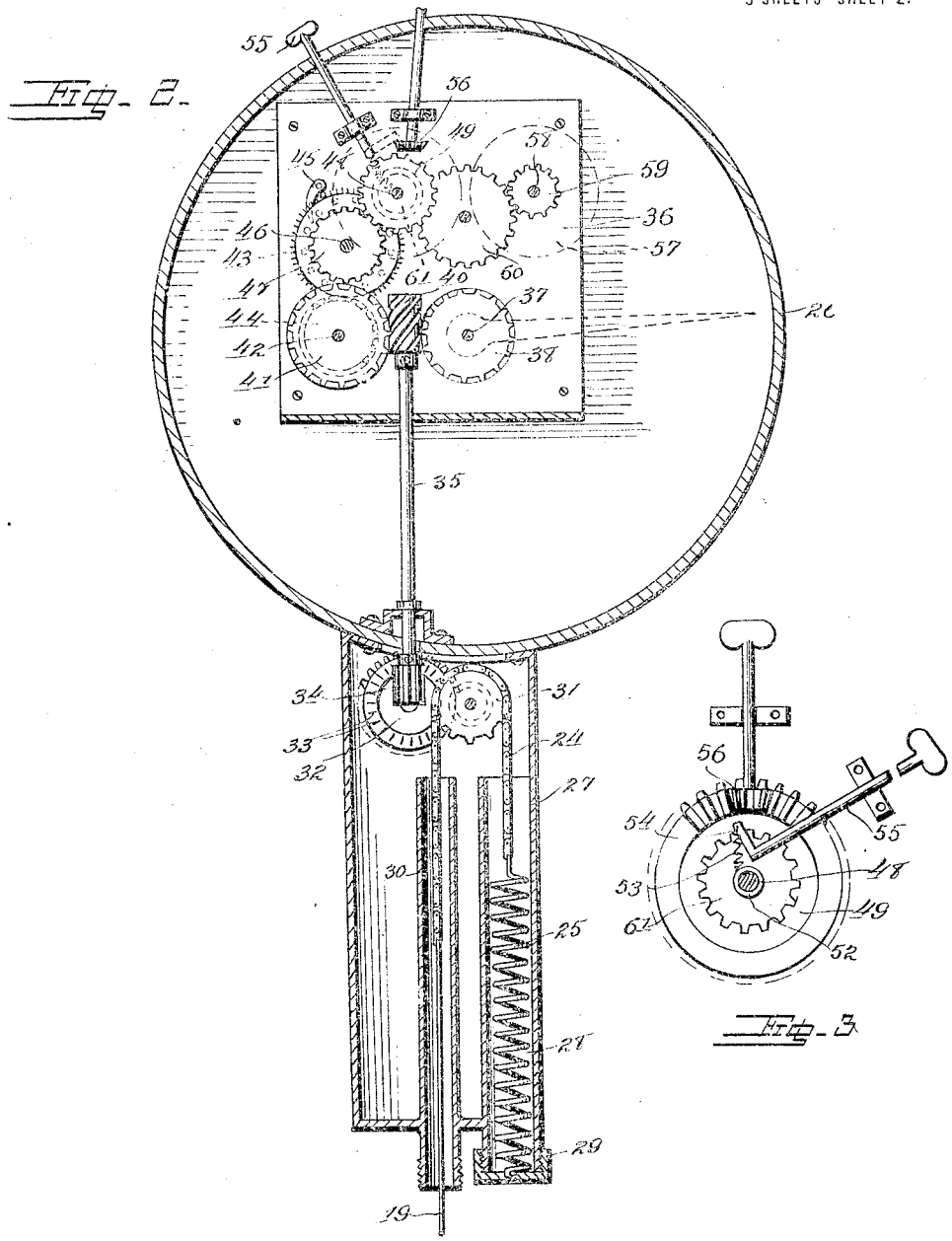

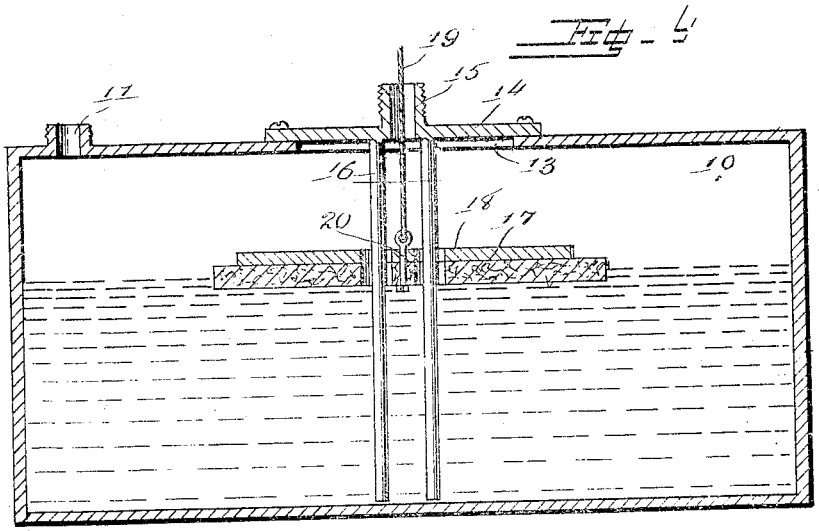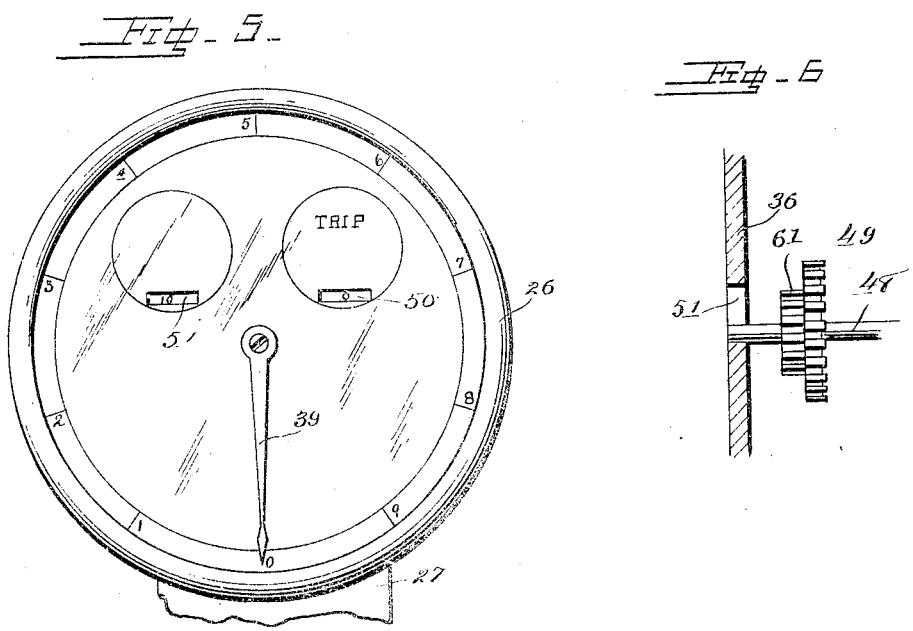

UNITED STATES PATENT OFFICE.

JOSEPH M. STELMACH, OF KENSAL, NORTH DAKOTA.

ZERO-SETTING DEVICE.

1,198,081.  Specification of Letters Patent.  Patented Sept. 12, 1916.

Application filed June 12, 1914. Serial No. 844,751.

*To all whom it may concern:*

Be it known that I, JOSEPH M. STELMACH, a citizen of the United States, residing at Kensal, in the county of Stutsman and State of North Dakota, have invented certain new and useful Improvements in Zero-Setting Devices, of which the following is a specification.

This invention relates to a gasolene gage and register and the principal object of the invention is to provide a device of the character described which is so constructed that it will indicate the amount of gasolene placed in a storage tank of an automobile and register the amount of gasolene used while on a trip and also register the amount of gasolene used during a season.

Another object of the invention is to provide improved means for operating the gage and register so that as the tank is filled with gasolene the hand indicating the amount of gasolene in the tank will move and so that when the automobile is running the register will operate and indicate the amount of gasolene used and the gage finger will move to show the amount of gasolene still remaining in the tank.

Another object of the invention is to so construct the register that the dial showing the amount of gasolene used on a trip may be turned back without the dial showing the amount of gasolene used during the season being turned back.

Another object of the invention is to so construct the register that when filling the tank with gasolene the indicating hand may be moved without the rest of the mechanism moving.

This invention is illustrated in the accompanying drawings, wherein—

Figure 1 is a side elevation showing the gasolene tank and pipe leading therefrom with the register and gage carried by the pipe; Fig. 2 is a vertical sectional view through the gage and register; Fig. 3 is a fragmentary view showing a part of the register operating mechanism; Fig. 4 is a vertical longitudinal sectional view through the gasolene tank; Fig. 5 is a view showing the face of the register and gage in elevation; Fig. 6 is a view showing the gears in Fig. 3 in elevation and showing the manner of slidably mounting the axle of the gears; and Fig. 7 is a fragmentary view showing the pipe disclosed in Fig. 1 in longitudinal section.

The gasolene tank 10 may be the tank of an automobile, motor boat or any engine of the internal combustion type run by gasolene or the like. This tank 10 is filled through the inlet 11 which is normally closed by the stopper 12. The tank is also provided with an opening 13 which is closed by a cover plate 14 through which there extends a neck 15 and from which there also extends the guiding arms 16. These guiding arms 16 extend through openings formed in the float 17 to guide the vertical movement of the float and prevent longitudinal movement of the float in the tank. A weight 18 is carried by the float so that as the gasolene is used the float will move downwardly and thus draw upon the line 19, the inner end of which is connected with the eye bolt 20 carried by the float.

A tube 21 which is formed of small piping leads from the neck 15 to the register and gage, the sections of the tube being connected by elbows 22, the central portions of which are enlarged to form pulley housings. The line 19 passes through the tube and around the pulley wheels 23 rotatably mounted in the housings of the elbows 22 and is connected with a sprocket chain 24 leading from a spring 25. It will thus be seen that as the float moves downwardly in the storage tank 10 the sprocket chain will be moved to operate the gage and register and that as the tank is filled with gasolene the spring will contract thus moving the sprocket chain to operate the gage.

The gage and register is provided with a housing 26 to which there is secured a depending casing 27. This casing 27 is provided with partitions forming a spring housing 28 in which spring 25 is positioned with its lower end connected with the closure 29 of the spring housing and also forming a conduit 40 with which the tube 21 is connected and through which the line 19 extends so that it may be connected with the sprocket chain 24 which extends into the upper end portion of the conduit 30. This sprocket chain passes around a sprocket wheel 31 which carries a small gear meshing with the teeth of gear 32 so that as the sprocket chain moves the gear 32 will rotate with its teeth 33 acting upon the worm 34 to rotate vertical shaft 35.

A frame 36 is mounted in the housing 26 and carries a shaft 37 upon which the gear 38 and gage finger 39 are rigidly mounted.

The gear 38 meshes with the worm 40 carried by vertical shaft 35 so that as the shaft 35 rotates the gage finger 39 will be oscillated and move to indicate the amount of gasolene in the tank 10. A second gear 41 is carried by a shaft 42 and engages the opposite side of the worm 40 so that as the shaft 35 rotates the shaft 42 will be rotated and rotary motion transmitted to the gear 43 through the medium of the gear 44 carried by shaft 42. The teeth of gear 43 are resilient so that when the gear 43 is held stationary by pawl 45 the teeth of gear 44 may move past the teeth of gear 43 without rotating gear 43. This gear 43 is rigidly mounted upon a shaft 46 upon which gear 47 is rigidly mounted to transmit rotary motion to the shaft 48 through the medium of gear 49. Shaft 48 carries a suitable dial 50 so that the amount of gasolene used during the trip may be readily ascertained by looking at the face of the gage and register shown in Fig. 5. From an inspection of Fig. 6 it will be readily seen that the shaft 48 is slidably and rotatably mounted in the slot 51 of the frame 36 and from an inspection of Fig. 3 it will be readily seen that shaft 48 passes through a ring 52 with which spring 53 is connected. This spring 53 is connected with the finger 54 of key 55 so that when the key is turned to the dotted line position shown in Fig. 2 the shaft 48 may be drawn upwardly and move gear 49 into engagement with gear 56' of key 56 thus permitting the dial 50 to be turned back without the dial of the season register being turned back. The key 55 can then be returned to the normal position. The season dial 57 is carried by shaft 58 upon which a gear 59 is mounted, the gear 59 meshing with a gear 60 which engages gear 61 so that rotary motion may be transmitted to the season dial.

In the operation of this device, the tank 10 is filled with gasolene and will move the float 17 upwardly thus permitting the spring 25 to contract and rotate shaft 31 through the medium of sprocket chain 24 thus causing the vertical shaft 35 to rotate and turn the gage hand 39 to indicate the amount of gasolene placed in the tank. It has already been explained that while the hand 39 is turning to indicate the amount of gasolene placed in the tank the pawl 45 will hold gear 43 stationary and as the teeth of the gear 43 are resilient gear 44 will pass gear 43 without turning the same. As the gasolene is used the float 17 moves downwardly and will cause shaft 35 to be rotated in the opposite direction thus rotating the various gears and causing the two registering dials to move to indicate the amount of gasolene used during a trip and increase the amount shown on the season dial. After returning from a trip the shaft 48 can be drawn to bring gear 49 into engagement with gear 56' and key 56 then rotated to return the trip dial to show a cipher. Shaft 48 is returned to its original position. It will thus be seen that while the trip dial is returned to show a cipher the season dial will not be rotated and therefore the amount of gasolene registered by the season dial will not be changed. A person can therefore keep a record of how much gasolene is used on each trip and how much gasolene is used in a season. He can also readily ascertain how much gasolene has been placed in the storage tank by noting the amount of gasolene indicated by hand 39 before the tank is filled and then noting the point to which the hand 39 moved after the tank is filled.

What is claimed is:—

In a device of the character described a casing, a setting element including a gear in said casing, a shaft slidably carried by said casing, a dial carried by said shaft, a gear carried by said shaft, means for transmitting rotary motion to said slidably mounted shaft through the medium of the gear carried thereby, a shifting key rotatably connected with said casing and having its inner end portion provided with a finger, and means connecting said finger with said slidably mounted shaft whereby sliding movement may be imparted to said shaft through the rotation of said shifting key.

In testimony whereof I affix my signature in presence of two witnesses.

JOSEPH M. STELMACH.

Witnesses:
W. L. SCOTT,
H. S. POSEY.